United States Patent [19]
Kwak et al.

[11] Patent Number: 5,987,369
[45] Date of Patent: Nov. 16, 1999

[54] SYSTEM AND METHOD OF CONTROLLING SEMIACTIVE SUSPENSION

[75] Inventors: Byung-Hak Kwak; Jung-Soo Shim, both of Kyungki-Do, Rep. of Korea

[73] Assignee: Mando Machinery Corporation, Kyungki-Do, Rep. of Korea

[21] Appl. No.: 08/962,546

[22] Filed: Oct. 31, 1997

[30] Foreign Application Priority Data

Oct. 31, 1996 [KR] Rep. of Korea .................. 9650792

[51] Int. Cl.$^6$ .................................................. B60G 25/00
[52] U.S. Cl. .................................... 701/37; 280/5.512
[58] Field of Search ............................. 701/37, 38, 39; 280/5.512, 5.514, 5.515

[56] References Cited

U.S. PATENT DOCUMENTS

| | | | |
|---|---|---|---|
| 5,131,676 | 7/1992 | Kii et al. ................................ | 701/37 |
| 5,467,280 | 11/1995 | Kimura ................................ | 701/37 |
| 5,475,596 | 12/1995 | Henry et al. ......................... | 701/37 |

*Primary Examiner*—Tan Nguyen
*Attorney, Agent, or Firm*—Oblon, Spivak, McClelland, Maier & Neustadt, P.C.

[57] ABSTRACT

A system and method of controlling a semiactive suspension is disclosed. The system and method effectively selects appropriate damping force curves for the dampers of the four wheels in accordance with both an output vertical acceleration signals from three vertical acceleration sensors installed on the dampers of three wheels and an output axle acceleration signal from an axle acceleration sensor installed on the axle. At the resonance frequency band of a car body, the system and method controls the suspension according to the vertical speeds and ride values, calculated from the vertical acceleration signals, thus reducing the uncomfortable riding effects of the vehicle. Meanwhile, at the resonance frequency band of the axle, the system and method controls the suspension with a higher damping force thus securing steering safety of the vehicle.

9 Claims, 7 Drawing Sheets

SYSTEM AND METHOD OF CONTROLLING SEMIACTIVE SUSPENSION

BACKGROUND OF THE INVENTION

1. Field of the Invention

The present invention relates, in general, to a semiactive suspension fixed to wheels for absorbing and reducing uncomfortable effects such as vibrations in a vehicle and, more particularly, to a system and method of controlling such a suspension suitable for operating processing output signals from acceleration sensors while a vehicle is in a straight travelling or cornering mode, thus checking road surface conditions and vibrations of the vehicle and independently controlling the damping forces of dampers for all four wheels.

2. Description of the Prior Art

In order to provide comfortable and smooth ride, vibration caused by road surfaces have to be effectively absorbed and reduced. In the event of vertical vibrations, passengers easily feels vibrations at a frequency band of about 5–7 Hz, which is the resonance frequency band of the human autonomic nervous system. Meanwhile, the frequency band of horizontal vibrations, sensed by a person, is lower than that of the vertical vibrations.

With this regard, it is necessary for a vehicle to reduce uncomfortable effects of going over uneven road surfaces, unpaved road surfaces, concrete-paved road surfaces or junctions of bridge spans. In order to achieve the above object, semiactive suspensions, individually having a variable spring constant or variable damping force, are widely used in various vehicles.

FIG. 1 is a block diagram showing the construction of a typical automatic control system for semiactive suspensions. As shown in the drawing, the control system has a plurality of signal input members: a vertical acceleration sensor 10, a speed sensor 20, a throttle position sensor (TPS) 30, a steering angle sensor 40 and a brake switch 50. The vertical acceleration sensor 10 checks the vertical acceleration of a vehicle. The speed sensor 20 checks the speed of the vehicle. The throttle position sensor 30 checks the opening angle of the throttle valve of an engine. The steering angle sensor 40 checks the steering angular velocity of a steering system. The brake switch 50 checks the operation of a brake system. In the operation of the above control system, the signals from the above signal input members 10, 20, 30, 40 and 50 are processed by an electronic control unit (ECU) 100 in accordance with a preset program. After processing the signals, the ECU 100 determines the desirable damping forces for controlling the variable dampers 200, which are fixed to the wheels of a vehicle. The above semiactive suspension thus provides comfortable ride to a driver and passengers and secures steering safety of the vehicle.

The above automatic control system controls three modes of the variable variable dampers 200: soft, medium and hard modes. In order to control the damping mode, the control signals from the ECU 100 are applied to four damper actuators 210, 220, 230 and 240. Upon receiving the control signals from the ECU 100, the actuators 210 to 240 rotate the control rods of associated shock absorbers thus changing the cross-sectioned areas of the oil passages for the shock absorbers to convert the damping mode.

In FIG. 1, the reference number 60 denotes a mode select switch.

The ECU 100 of the control system comprises a plurality of independent control logics, which independently control the semiactive suspension between the three damping modes in accordance with conditions of a vehicle as follows.

First, an anti-bounce control logic of the ECU 100 checks bumps or rough road surfaces and selectively converts the damping mode of the dampers 200 into the medium mode thus preventing bouncing of the vehicle when both the speed of a vehicle is-not less than $V_1$ Kph and the vertical acceleration at the vehicle's center of gravity (console box) is not less than $G_1$g. After the lapse of $t_1$ seconds from the above conditions, the anti-bounce control logic returns the medium damping mode into the standard damping mode.

Second, an anti-shake control logic of the ECU 100 converts the damping mode of the dampers 200 into the hard mode when the speed of the vehicle is not higher than $V_2$ Kph, thus making the vehicle barely shake while a passenger gets in or out of the vehicle or when the vehicle is being loaded or unloaded. When the vehicle maintains a speed of not less than $V_{21}$ Kph for at least $t_2$, the anti-shake control logic returns the hard mode into the original mode.

The anti-shake control logic converts the damping mode into the medium mode when the vehicle, travelling at a high speed, maintains a speed of not less than $V_3$ Kph for at least $t_3$, thus securing steering safety in the above conditions. When the speed of the vehicle is not higher than $V_{31}$ Kph, the anti-shake control logic returns the damping mode into the original mode.

Third, an anti-squat control logic of the ECU 100 reduces the vertical vibrations of the front end of the vehicle when the vehicle starts at a low speed. In order to achieve the above object, the anti-squat control logic converts the damping mode into the medium mode when both the speed of the vehicle is less than $V_4$ Kph and the opening angle of the throttle valve is higher than $\theta_4$ Deg. Meanwhile, the anti-squat control logic returns the damping mode in the original mode in the event of either the lapse of $t_4$ seconds or when the speed of the vehicle is higher than $V_{41}$ Kph.

Fourth, an anti-dive control logic of the ECU 100 reduces the diving of the front end of the vehicle when the vehicle, travelling at a mid to high speed, suddenly stops. In order to achieve the above object, the anti-dive control logic converts the damping mode into the hard mode, when the vehicle is braked at a speed of not less than $V_5$ Kph and a stop lamp switch is turned on. Meanwhile, the anti-dive control logic returns the damping mode into the original mode in the event of the lapse of $t_5$ seconds after the above conditions.

Fifth, an anti-roll control logic of the ECU 100 is for securing steering safety of the vehicle. In order to achieve the above object, the anti-roll control logic converts the damping mode into the hard mode when the steering angle is higher than a reference angle with a speed of the vehicle being not less than $V_6$ Kph. Meanwhile, the anti-roll control logic returns the damping mode into the original mode in the event of the lapse of $t_6$ seconds after the above conditions.

However, the above automatic control system for semiactive suspensions is problematic in that it provides a low damping force for controlling the suspensions of a vehicle, thus failing to either precisely controlling the suspensions or effectively reducing uncomfortable ride. Another problem experienced with a conventional control system is that it has a slow reaction thus failing to rapidly react to the abrupt change of the conditions of a vehicle. The typical automatic control system for semiactive suspensions fails to provide provide neither a better comfortable ride nor reliably secures steering safety of a vehicle in comparison with a typical manual control system for semiactive suspensions.

SUMMARY OF THE INVENTION

It is, therefore, an object of the present invention to provide a system and method of controlling a semiactive suspension in which the above problems can be overcome by processing output signals from three vertical acceleration sensors installed at three positions of a vehicle which checks road surface conditions and vibrations of the vehicle, in order to independently controls the damping forces of variable dampers for the four wheels of the vehicle, thus giving comfortable ride at the resonance frequency band of a car body, hence increasing the frictional contact force between the wheels and the road surface at the resonance frequency band of an axle, thus effectively securing steering safety of the vehicle.

In order to accomplish the above objects, the present invention provides a system for controlling a semiactive suspension provided with four variable dampers at positions between four wheels and a car body, comprising: three vertical acceleration sensors installed on three dampers adapted for checking vertical accelerations of three wheels provided with the vertical acceleration sensors prior to outputting vertical acceleration signals; an axle acceleration sensor installed on an axle adapted for checking the vertical acceleration of the axle prior to outputting an axle acceleration signal; a ride control logic adapted for processing the vertical acceleration signals output from the vertical acceleration sensors, calculating both a vertical speed and an average speed of each wheel prior to calculating a power value for each wheel by multiplying the average speed by the vertical speed; a wheel resonance control logic adapted for operating the axle acceleration signal output from the axle acceleration sensor to form a resonance frequency band; and an integration logic adapted for continuously determining a damping force curve for controlling each damper using both the ride value of the ride control logic and the wheel resonance value of the wheel resonance control logic within a predetermined loop time, thus independently controlling each wheel at an actual time.

The invention also provides a semiactive suspension control method comprising: a vertical speed calculating step of integrating an output vertical acceleration signals from three vertical acceleration sensors installed on three dampers, and calculating both a vertical speed of each of the three wheels having the vertical acceleration sensors and a vertical speed of another wheel without a vertical acceleration sensor; a running average speed calculating step for counting each integrated vertical speed in a given time and calculating an average of each vertical speed prior to calculating a power value for each wheel; an object damping force determining step for multiplying each signal of an axle resonance frequency band, thus calculating a wheel resonance value from the signal of the axle ride value by an corresponding vertical speed thus calculating a power value for each wheel prior to determining an object damping force of each damper; and a damper controlling step for outputting a control signal, indicative of each object damping force, to a corresponding damper actuator thus independently controlling each damper in an actual time.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
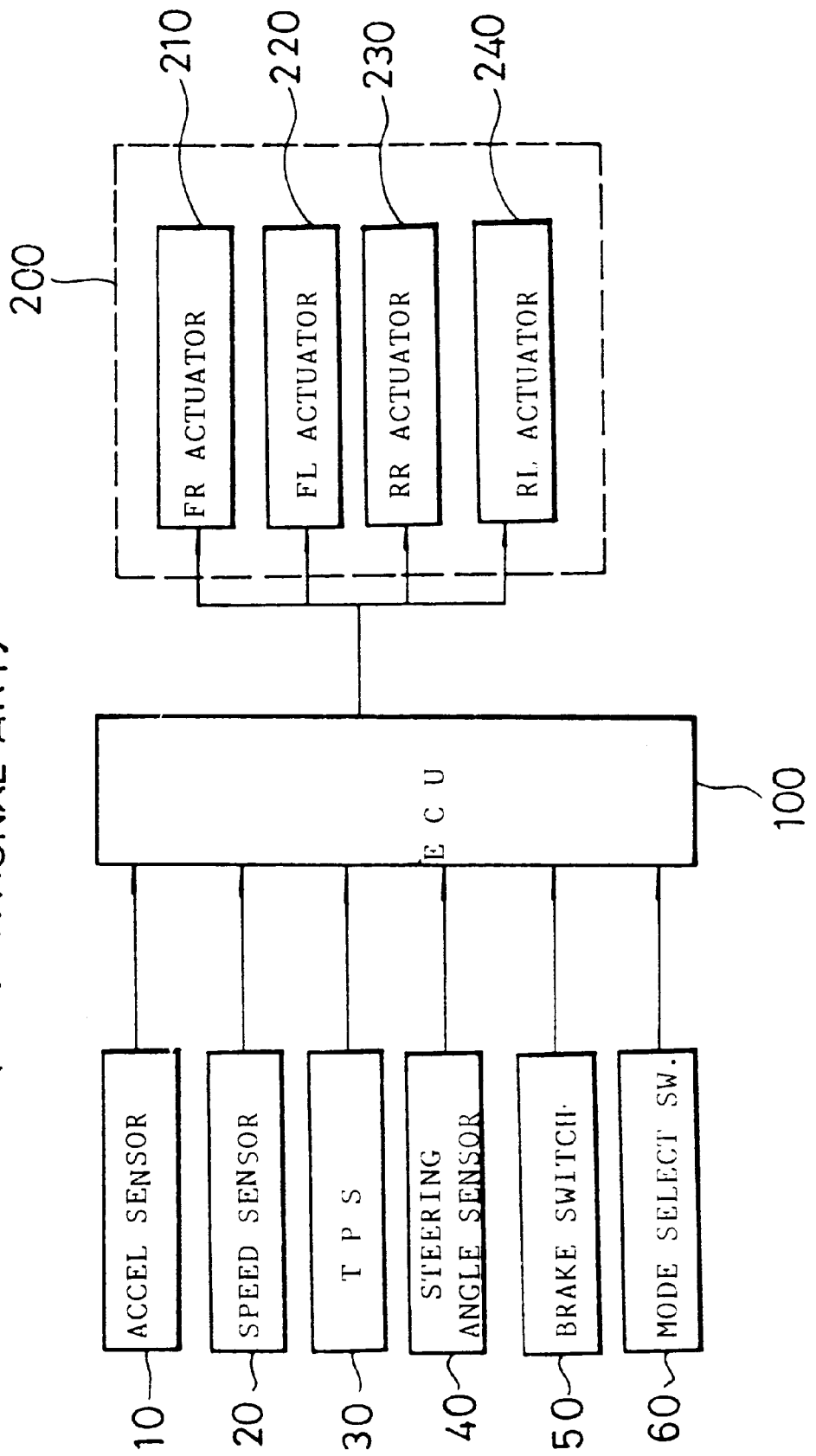
FIG. 1 is a block diagram of a typical automatic control system for semiactive suspensions.
Figure 2:
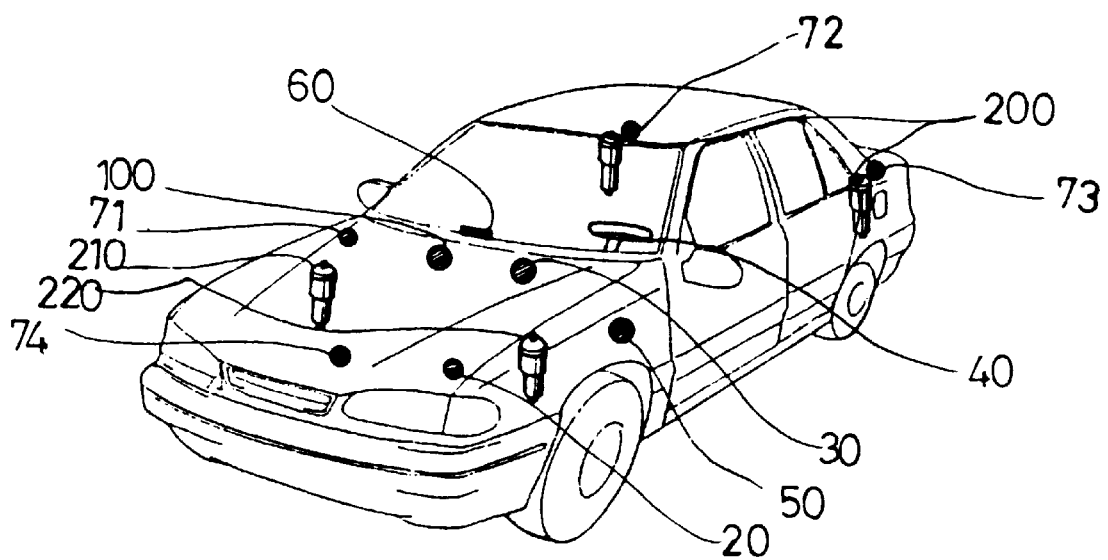
FIG. 2 is a perspective view of a vehicle showing the positions of a plurality of sensors of a semiactive suspension control system in accordance with the preferred embodiment of the present invention.
Figure 3:
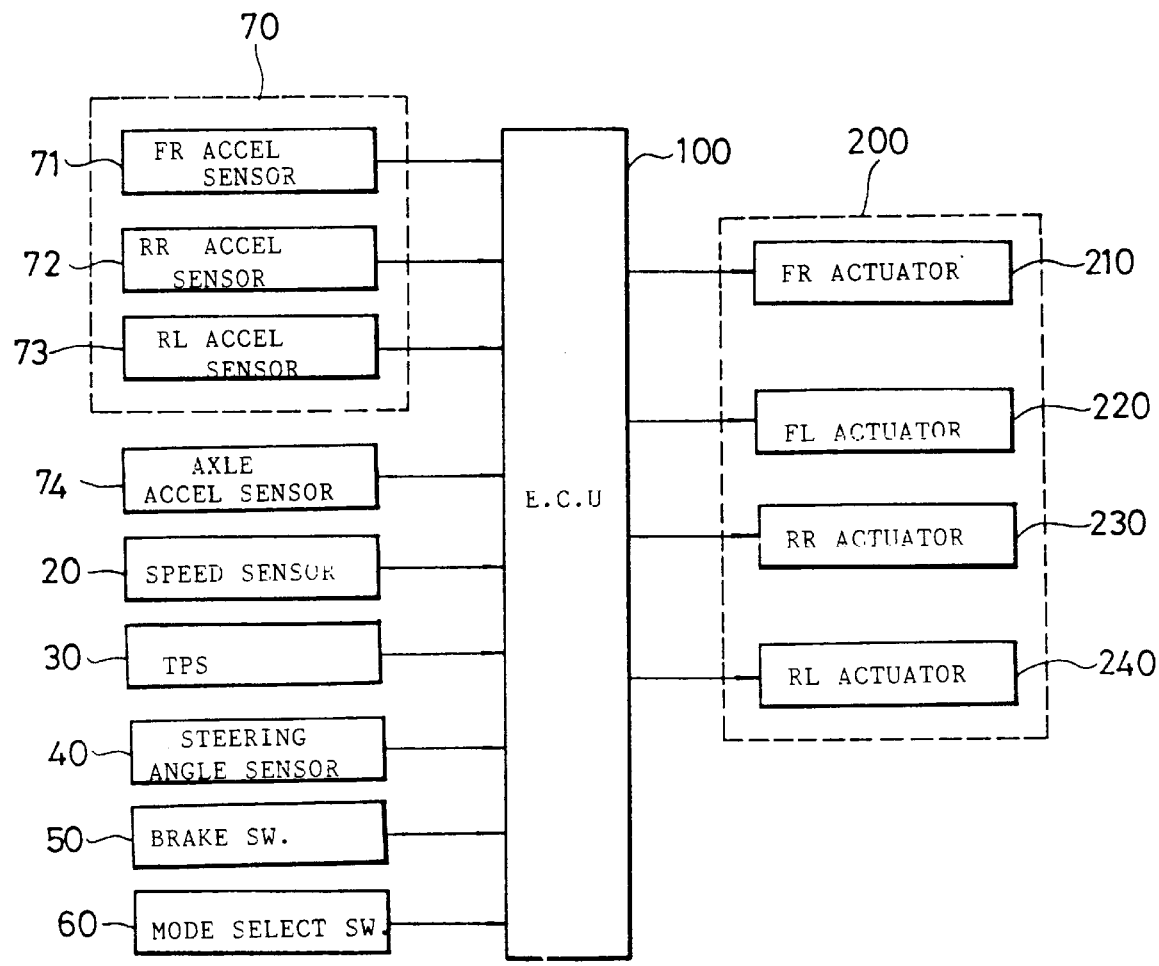
FIG. 3 is a block circuit diagram of the semiactive suspension control system of the present invention.

FIG. 2 is a perspective view of a vehicle showing the positions of a plurality of sensors of a semiactive suspension control system in accordance with the preferred embodiment of the invention. FIG. 3 is a block circuit diagram of the semiactive suspension control system of the present invention.

In the control system of this invention, three vertical acceleration sensors 71, 72 and 73 are installed around the front right (FR) wheel, the rear right (RR) wheel and the rear left (RL) wheel of a vehicle, respectively. The above three sensors 71 to 73 constitute a vertical acceleration sensor unit 70. Installed on the front wheel axle of the vehicle is an axle acceleration sensor 74.

The control system also has an electronic control unit (ECU) 100, which processes the acceleration signals from the four acceleration sensors 71 to 74 and continuously determines a damping force curve for controlling each damper 200 within a predetermined loop time prior to independently controlling each of the FR, FL, RR and RL actuators 210, 220, 230, 240 of the dampers 200 in actual time.

In FIGS. 2 and 3, the reference numerals 20, 30, 40, 50 and 60 denote an speed sensor, a throttle position sensor, a steering angle sensor, a brake switch and a mode select switch, respectively.

Figure 4:
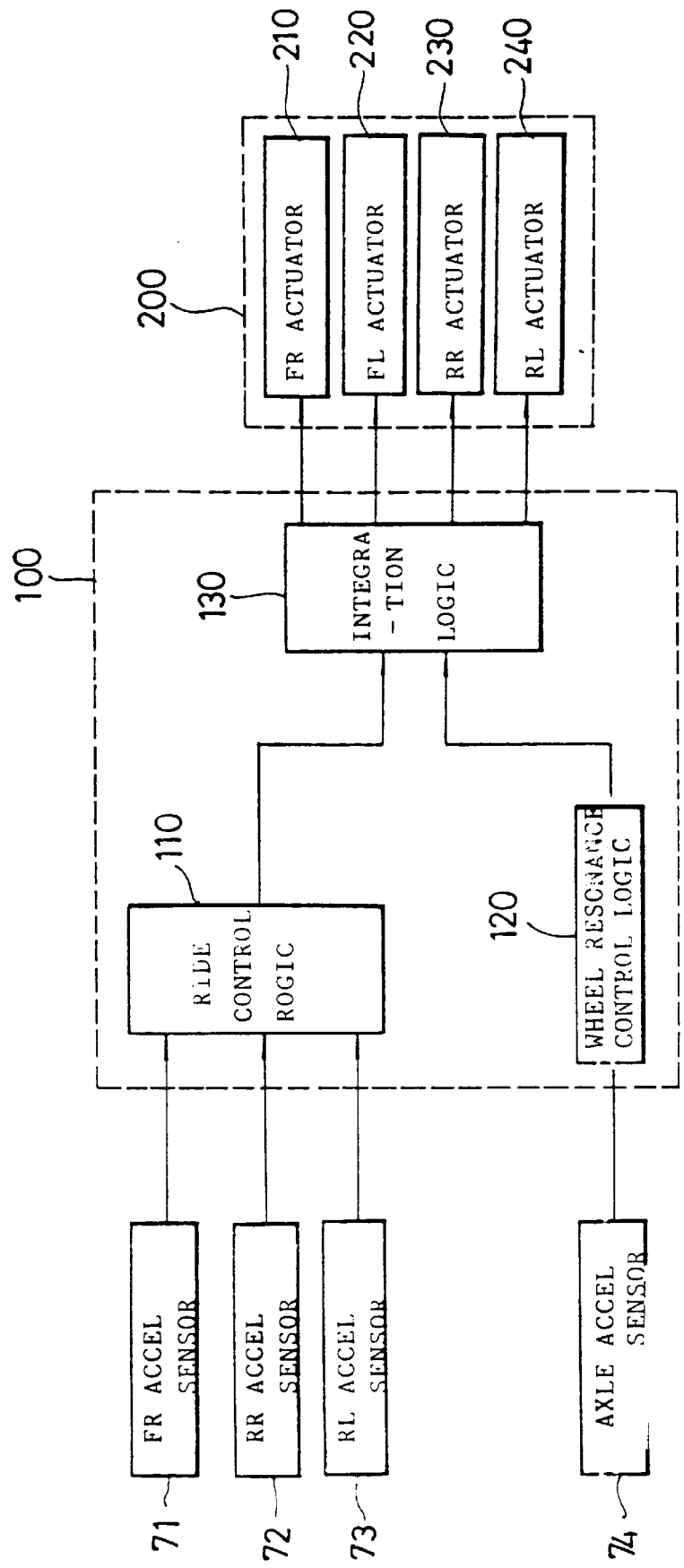
FIG. 4 is a block diagram showing the control logics of the semiactive suspension control system of the present invention.

FIG. 4 is a block diagram showing the control logics of the semiactive suspension control system of the present invention. As shown in FIG. 4, the ECU 100 of the control system comprises three control logics: a ride control logic 110, a wheel resonance control logic 120, and an integration logic 130. The ride control logic 110 processes the vertical output acceleration signals from the vertical acceleration sensors 71 to 73. The wheel resonance control logic 120 processes output the axle acceleration signal from the axle acceleration sensor 74. The integration logic 130 continuously determines a damping force curve for controlling each damper 200 according to the operation results of the two control logics 110 and 120 within a predetermined loop time prior to independently controlling each of the FR, FL, RR and RL actuators 210, 220, 230, 240 of the dampers 200 in actual time.

Figure 5:
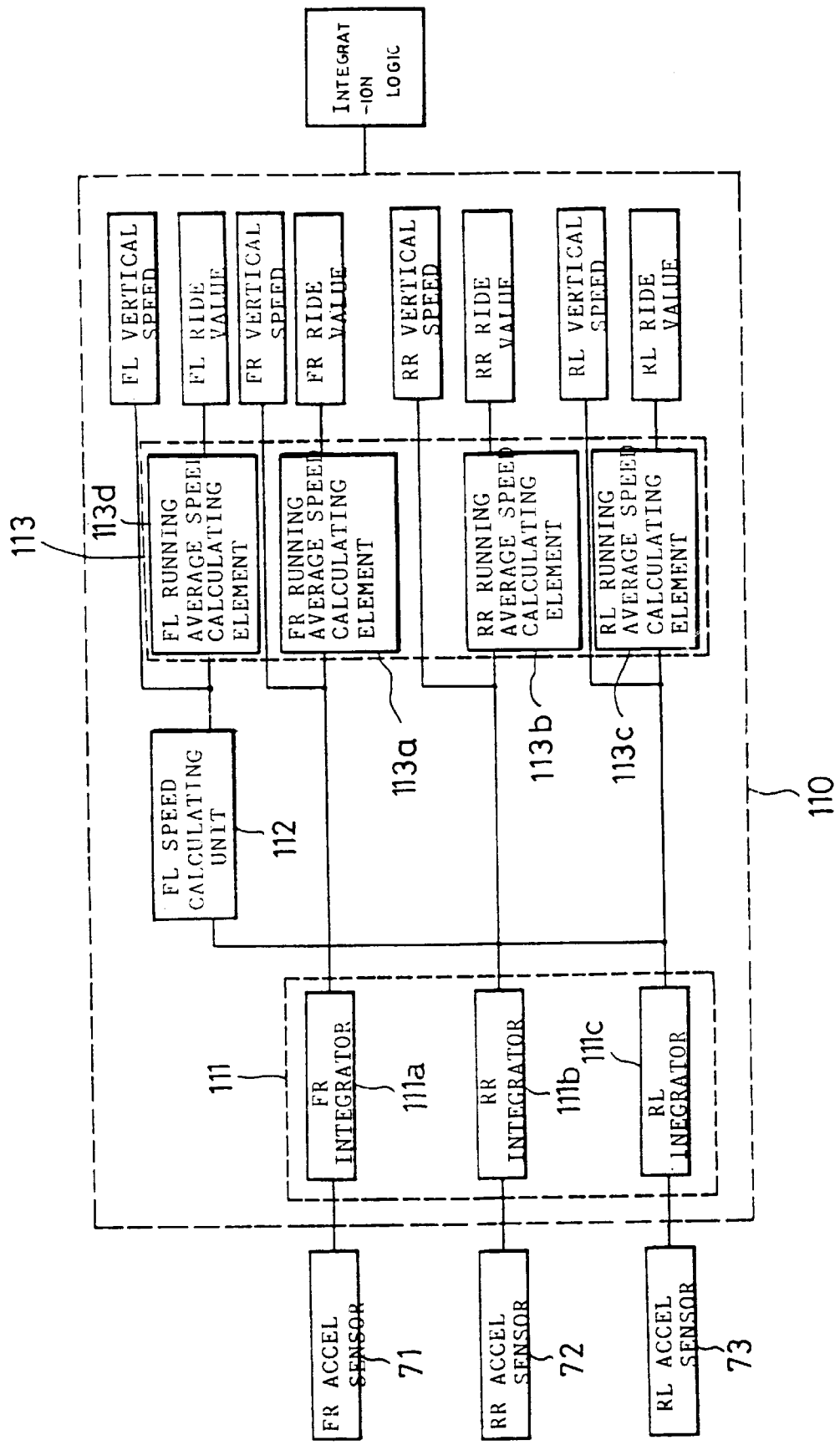
FIG. 5 is a block diagram of a ride control logic of the present invention.

FIG. 5 is a block diagram of the ride control logic 110. As shown in the drawing, the ride control logic 110 comprises an acceleration signal integrating unit 111, an FL speed calculating unit 112, and a running average speed operation unit 113. The signal integrating unit 111 comprises three integrators: FR, RR and RL integrators 111a, 111b and 111c. The three integrators 111a to 111c respectively integrate the output acceleration signals from the FR, RR and RL acceleration sensors 71 to 73, and calculate vertical speeds of the three wheels with the sensors 71 to 73 to generate signals corresponding to the calculated vertical speeds. The FL speed calculating unit 112 processes the output signals from the three integrators 111*a*, 111*b*, 111*c*, by addition and subtraction, to calculate a vertical speed of the front left (FL) wheel (hereinbelow, referred to simply as the 4th wheel) free from such a vertical acceleration sensor. Meanwhile, the running average speed operation unit 113 comprises four running average speed calculating elements: FR, RR, RL and FL running average speed calculating elements 113*a*, 113*b*, 113*c* and 113*d*. The four running average speed calculating elements 113*a* to 113*d* respectively calculate the average vertical speeds of the four wheels by processing the output vertical speeds calculated by the FR, RR, RL integrators 111*a* to 111*c*, and the FL speed calculating unit 112 respectively. If briefly described, the ride control logic 110 calculates FL, FR, RR and RL vertical speeds using F1 speed calculating unit 112 and the FR, RR, RL integrators 111*a* to 111*c* respectively. The ride control logic 110 also calculates FR, RR, RL and FL ride values using the four calculating elements 113*a*, 113*b*, 113*c* and 113*d* of the running average operation unit 113, respectively.

Figure 6:
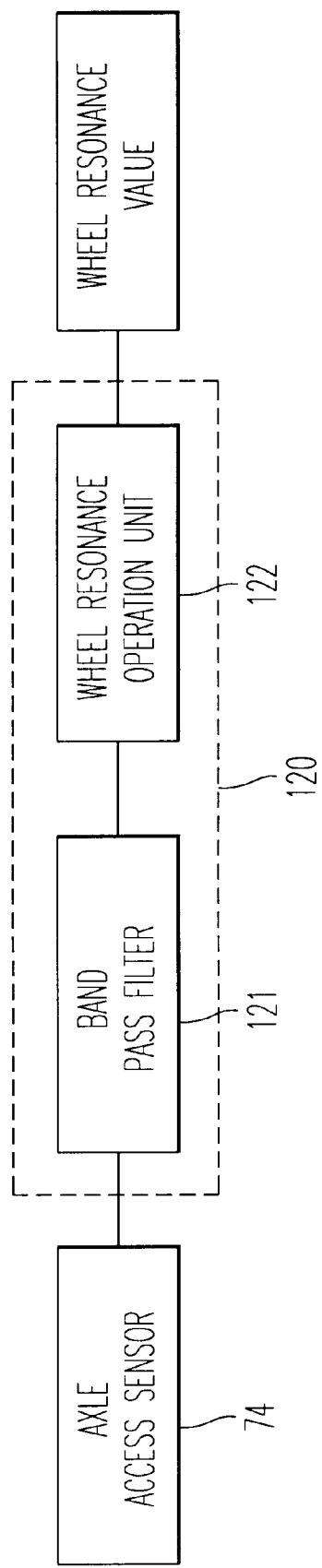
FIG. 6 is a block diagram of a wheel resonance control logic of the present invention.
Figure 7:
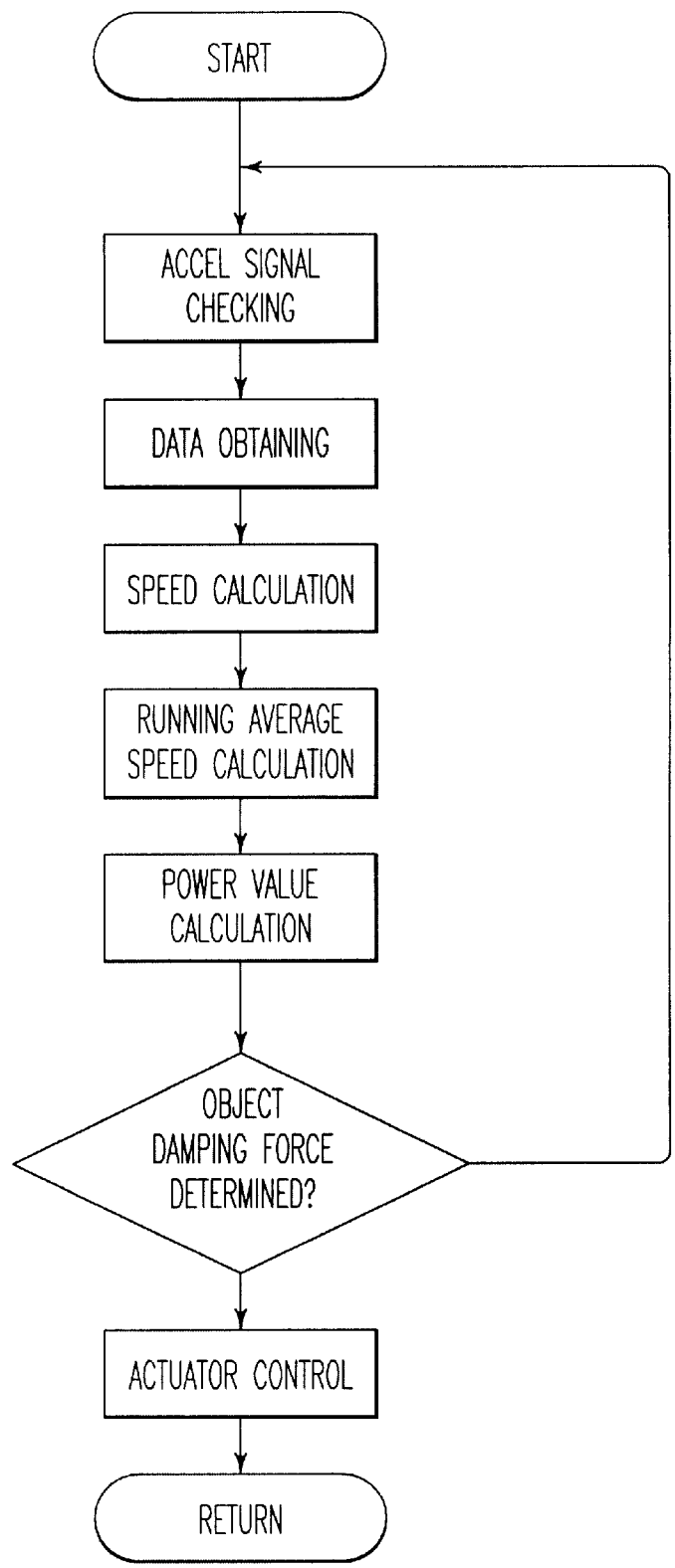
FIG. 7 is a flowchart of the semiactive suspension control method according to the present invention.

FIG. 6 is a block diagram of the wheel resonance control logic 120. As shown in the drawing, the wheel resonance control logic 120 comprises a band pass filter 121 and a wheel resonance operation unit 122. The band pass filter 121 filters the output acceleration signal from the axle acceleration sensor 74 to exclusively output a signal of a predetermined frequency band, while the wheel resonance operation unit 122 processes the output filtered signal of the predetermined frequency band from the band pass filter 121 to calculate a wheel resonance value.

The above control system controls the semiactive suspension as follows.

In the operation of the control system, the ride control logic 110 not only controls strain of a vehicle at the resonance frequency band of the car body to reduce uncomfortable vibrations of the vehicle, it also smoothly controls the damping forces of the dampers 200 at the resonance frequency band of the human autonomic nervous system thus providing comfortable ride to passengers.

The ride control logic 110 independently controls the four wheels of the vehicle. In the preferred embodiment of this invention, the control system only has the three vertical acceleration sensors 71 to 73 which are installed on the top portions of three wheel dampers 200.

In the operation of the ride control logic 110, the three integrators 111*a* to 111*c* respectively integrate the output signals from the vertical acceleration sensors 71 to 73 and calculates the vertical speeds of the wheels provided with the sensors 71 to 73. Thereafter, the ride control logic 110 calculates respective ride values of the four wheels from the actual time RMS values of the above vertical speeds. The ride control logic 110 in turn calculates power values for the four wheels by multiplying the ride values by respective vertical speeds.

In order to provide such a ride control logic 110, the integrating unit 111, FL speed calculating unit 112 and running average speed operation unit 113 of the logic 110 are designed as follows.

The integrating unit 111, comprising three integrators 111*a* to 111*c*, integrates an output vertical acceleration signal from each of the three acceleration sensors 71 to 73 installed at three positions of a vehicle, and uses a filter expressed by the following algebraic expression (1), to calculate a vertical speed of each of the three wheels provided with the sensors 71 to 73. In the expression (1), $\xi_1$ and $\omega_1$ are constants for determining a filter coefficient.

$$v_{1(s)}/\alpha_{1(s)} = S/(S^2 + 2\xi_1\omega_1 S + \omega_1^2)$$ [Expression 1]

The FL speed calculating unit 112 processes the signals corresponding to the vertical speeds calculated by the three integrators 111*a* to 111*c*, through addition and subtraction according to the following expression (2), thus calculating a vertical speed of the 4th wheel free from such a vertical acceleration sensor.

$$V_{fl} = V_{fr} + V_{rl} - V_{rr}$$ [Expression 2]

The running average speed operation unit 113 takes an average vertical speed of each of the four wheels and calculates a ride value for each of the wheels using a filter expressed by the following expression (3). Each ride value is multiplied by the vertical speed of a corresponding wheel thus providing a power value for the wheel. In the expression (3), $T_1$ is a constant for determining a filter coefficient used for calculating each ride value.

$$\overline{vi}(s)/(v_i(s))^2 = 1/(T_1 S + 1)$$ [Expression 3]

The running average speed operation unit 113 calculates the ride values from the RMS values of the vertical speeds in accordance with the following expression (4).

$$S_{ride}^i = (c_{ride}^i/v_{ride}) \cdot \overline{v_i}$$ [Expression 4]

The wheel resonance control logic 120 controls the axle through a resonance control at the resonance frequency band of the axle, thus effectively securing steering safety of the vehicle.

In the wheel resonance control logic 120, the band pass filter 121 filters the output acceleration signal from the axle acceleration sensor 74 using a filter expressed by the following expression (5) thus providing a signal of an axle resonance frequency band. In the expression (5), $\xi_2$ and $\omega_2$ are constants for determining a filter coefficient used for providing the signal of the axle resonance frequency band.

$$(v_w(s))^2/(\alpha_w(s))^2 = 2\xi_2\omega_2 S/(S^2 + 2\xi_2\omega_2 S + \omega_2^2)$$ [Expression 5]

The wheel resonance operation unit 122 calculates a wheel resonance value from the output signal of the axle resonance frequency band from the band pass filter 121, using a filter expressed by the following expression (6). In the expression (6), $T_2$ is a constant for determining a filter coefficient used for calculating the wheel resonance value.

$$(\overline{v_w}(s))^2/(v_w(s))^2 = 1/(T_2 S + 1)$$ [Expression 6]

The wheel resonance value is calculated from the results of the above expression (6) in accordance with the following expression (7).

$$S_{wheel} = (C_{wheel}/v_s) \cdot c \cdot \overline{v_w^2}$$ [Expression 7]

The vertical speeds and ride values obtained from the ride control logic 110 and the wheel resonance values obtained from the wheel resonance control logic 120 are integrated by the integration logic 130, which determines an appropriate damping force for the dampers installed on the wheels.

The following expression (8) is for determining an appropriate damping force curve for controlling each damper 200. In the expression (8), $S_{wheel}$ is a wheel resonance value calculated by the wheel resonance control logic 120, and $S_{ride}{}^i$, $V_i$ are a ride value and a vertical speed calculated by the ride control logic 110 respectively.

$$S_i = \text{MID} + S_{wheel} + V_i \cdot S_{ride}{}^i \qquad \text{[Expression 8]}$$
$$\cdot \text{if} S_i \leq \text{MIN}, S_i = \text{MIN}$$
$$\cdot \text{if} S_i \geq \text{MAX}, S_i = \text{MAX}$$

The appropriate damping force curves for controlling the dampers 200, calculated in accordance with the above expression (8), are determined at every control loop at a regular timing. In the control system, the four damper actuators 210, 220, 230 and 240 are stepping motors, hence it is necessary to continuously change the appropriate damping force curve for each damper 200 within a predetermined band loop time.

Therefore, the semiactive suspension control logic of the present invention has a dual time control structure, in which the appropriate damping force curve for an object damper is determined at every loop time, and the system only controls the appropriate damping force curve for the maximum movable damper at every actuator control time.

That is, the semiactive suspension control method of the present invention comprises a vertical speed calculating step, a running average speed calculating step, an object damping force determining step and a damper controlling step. In the vertical speed calculating step, the control logic of the system integrates output vertical acceleration signals from the three vertical acceleration sensors and calculates vertical speeds of the four wheels. In the running average speed calculating step, the control logic counts the integrated vertical speed of each wheel in a given time thus calculating an average of the vertical speed of each wheel prior to calculating a ride value for each wheel. In the object damping force determining step, the control logic multiplies the ride value by the vertical speed thus calculating a power value for each of the four wheels. In the damper controlling step, the control logic outputs a control signal, indicating each object damping force, to a corresponding damper actuator, thus independently controlling the damping force of the damper for each of the four wheels in an actual time prior to returning to the first step or the vertical speed calculating step. The control system controls the control rods of the dampers while moving each control rod to the maximum in the main control loop within a 10 ms loop time.

In the present invention, the system and method of controlling a semiactive suspension receives the signals indicating the vertical accelerations of three wheels with vertical acceleration sensors, and calculates both a vertical speed of each wheel having such vertical acceleration sensor and a vertical speed of another wheel free from vertical acceleration sensor. The system and method thus effectively calculates the vertical speeds of the four wheels prior to independently controlling the dampers of the four wheels.

As described above, the present invention provides a system and method of controlling a semiactive suspension. The control system and method of this invention effectively selects appropriate damping force curves for the dampers of the four wheels in accordance with both vertical acceleration signals from three vertical acceleration sensors installed on the top portions of dampers of three wheels, and an axle acceleration signal output from an axle acceleration sensor installed on the axle.

Therefore, at the resonance frequency band of a car body, the control system and method of this invention controls the suspension in proportion to the vertical speeds and ride values calculated from the signals output from the vertical acceleration sensors of the three wheels, thus reducing the uncomfortable riding effects at the resonance frequency band of the car body. Meanwhile, at the resonance frequency band of an axle, the system and method controls the suspension with a higher damping force thus securing steering safety of a vehicle at the resonance frequency band of the axle. The system and method of this invention thus optimally controls the suspension while driving on various road conditions, thus providing comfortable ride and securing steering safety.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling a semiactive suspension provided with four variable dampers at positions between four wheels and a car body, comprising:

three vertical acceleration sensors installed on three dampers for detecting vertical accelerations of three wheels provided with the vertical acceleration sensors prior to outputting vertical acceleration signal;

an axle acceleration sensor installed on an axle for checking a vertical acceleration of the axle prior to outputting an axle acceleration signal;

a ride control logic for processing the vertical acceleration signals output from said vertical acceleration sensors, thus calculating both a vertical speed and an average speed of each wheel prior to calculating a power value for each wheel by multiplying said average speed by said vertical speed;

a wheel resonance control logic for processing said axle acceleration signal output from said axle acceleration sensor to generate a signal of an axle resonance frequency band, thus calculating a wheel resonance value from the signal of the axle resonance frequency band; and an integration logic adapted for continuously determining a damping force curve for controlling each damper using both the ride value of the ride control logic and the wheel resonance value of the wheel resonance control logic within a predetermined loop time, thus independently controlling each wheel at an actual time.

2. The system according to claim 1, wherein said ride control logic comprises:

an acceleration signal integrating unit for integrating the vertical acceleration signals output from the vertical acceleration sensors, thus calculating the vertical speeds of the three wheels provided with the vertical acceleration sensors;

a speed calculating unit for processing output signals output from said integrating unit indicating the vertical speeds of the three wheels, thus calculating a vertical speed of a 4th wheel free from a vertical acceleration sensor; and a running average speed operation unit for calculating the average speeds of the four wheels from the vertical speeds.

3. The system according to claim 2, wherein said acceleration signal integrating unit integrates an output vertical acceleration signal from each of the three vertical acceleration sensors, using a filter expressed by the following expression, thus calculating a vertical speed of each of the three wheels provided with the vertical acceleration sensors $$v_{l(s)}/\alpha_{l(s)} = S/(S^2 + 2\xi_1\omega_1 S + \omega_1^2).$$

4. The system according to claim 2, wherein said running average speed operation unit calculates the power value for each wheel using a filter expressed by the following expression $$\overline{v_l}(s)/(v_l(s))^2 = 1/(T_r S + 1).$$

5. The system according to claim 1, wherein said wheel resonance control logic comprises:
   a band pass filter for filtering the output axle acceleration signal from the axle acceleration sensor, thus exclusively outputting a signal of a predetermined frequency band; and
   a wheel resonance operation unit for processing the output signal of the predetermined frequency band output from the band pass filter, thus calculating the wheel resonance value.

6. The system according to claim 5, wherein said band pass filter filters the axle acceleration signal using a filter expressed by the following expression, thus providing a signal of an axle resonance frequency band $$(v_w(s))^2/(\alpha_w(s))^2 = 2\xi_2\omega_2 S/(S^2 + 2\xi_2\omega_2 S + \omega_2^2).$$

7. The system according to claim 5, wherein said wheel resonance operation unit calculates the wheel resonance value of an axle resonance frequency band using a filter expressed by the following expression $$(\overline{v_w}(s))^2/(v_w(s))^2 = 1/(T_2 S + 1).$$

8. A method of controlling a semiactive suspension provided with four variable dampers at positions between four wheels and a car body, comprising:
   a vertical speed calculating step of integrating output vertical acceleration signals from three vertical acceleration sensors installed on three dampers, and calculating both a vertical speed of each of the three wheels having the vertical acceleration sensors and a vertical speed of another wheel free from a vertical acceleration sensor;
   a running average speed calculating step of counting each integrated vertical speed a given time and calculating an average of each vertical speed prior to calculating a ride value for each wheel;
   an object damping force determining step of multiplying each ride value by a corresponding vertical speed thus calculating a power value for each wheel prior to determining an object damping force of each damper; and
   a damper controlling step of outputting a control signal, indicative of each object damping force, to a corresponding damper actuator thus independently controlling each damper in actual time.

9. The method according to claim 8, wherein the vertical speed of the wheel free from a vertical acceleration sensor is calculated by adding or subtracting the vertical speeds of the three wheels having the vertical acceleration sensors.

* * * * *